Figure 1:
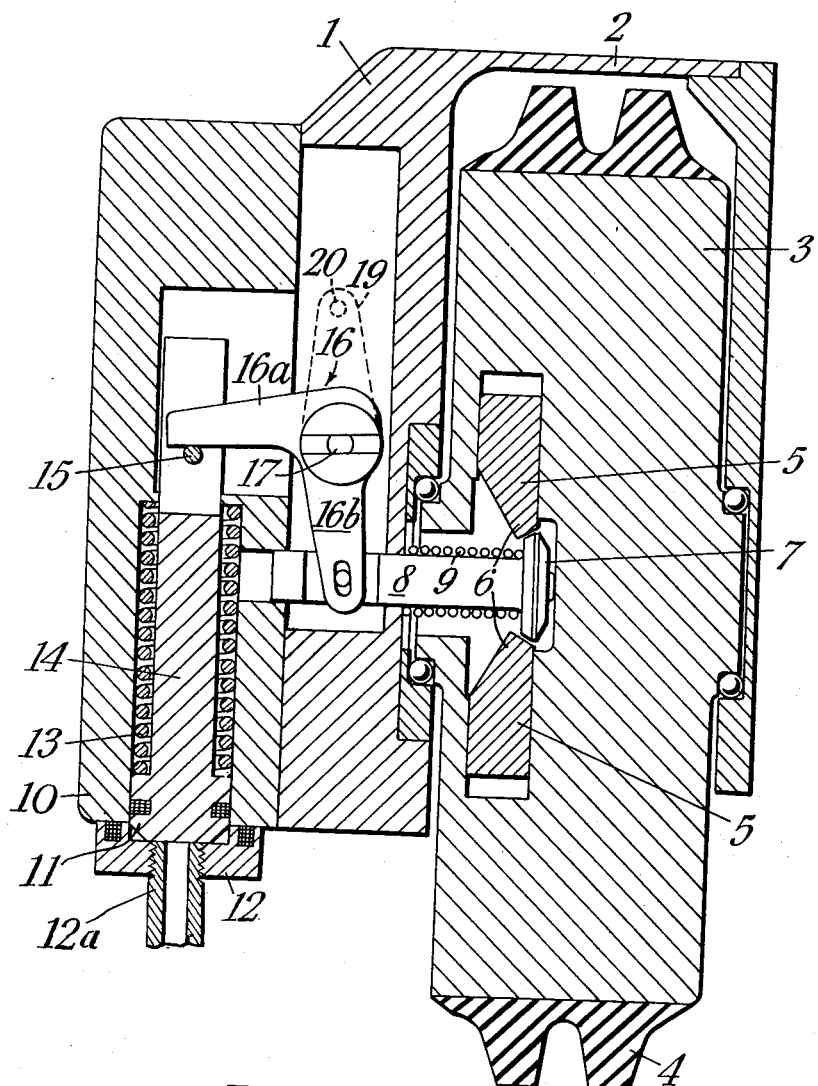

Nov. 8, 1955  D. DEWAR ET AL  2,723,090
BRAKING SYSTEMS FOR AIRCRAFT
Filed Oct. 29, 1952  6 Sheets-Sheet 3

Nov. 8, 1955  D. DEWAR ET AL  2,723,090
BRAKING SYSTEMS FOR AIRCRAFT
Filed Oct. 29, 1952  6 Sheets-Sheet 4

Nov. 8, 1955

D. DEWAR ET AL 2,723,090

BRAKING SYSTEMS FOR AIRCRAFT

Filed Oct. 29, 1952

6 Sheets-Sheet 5

Inventors:
Douglas Dewar
Frank Radcliffe Mortimer
by Benj. T. Rauber
their attorney Nov. 8, 1955          D. DEWAR ET AL          2,723,090
              BRAKING SYSTEMS FOR AIRCRAFT
Filed Oct. 29, 1952                    6 Sheets-Sheet 6

INVENTORS
Douglas Dewar
Frank Radcliffe Mortimer

BY Benj. T. Rauber
                    ATTORNEY

United States Patent Office 2,723,090
Patented Nov. 8, 1955

2,723,090

BRAKING SYSTEMS FOR AIRCRAFT

Douglas Dewar, Wolston, near Coventry, and Frank Radcliffe Mortimer, Stivichale, England, assignors to Dunlop Rubber Company Limited, London, England, a British company Application October 29, 1952, Serial No. 317,522

9 Claims. (Cl. 244—111)

This invention relates to fluid-pressure operated braking systems for aircraft having retractable undercarriages.

In a co-pending application of Trevaskis and Mortimer, Ser. No. 221,436, filed April 17, 1951, now Patent No. 2,692,100, October 19, 1954, a braking system for aircraft is disclosed in which the application of the brakes is prevented until the landing wheels rotate on landing. The braking system of this application may also comprise a braking system disclosed in Trevaskis Patent No. 2,656,017, granted October 20, 1953, in which the application of the brakes is interrupted whenever the deceleration of the aircraft exceeds a predetermined limit.

In the braking system of said co-pending application, a permissive control valve unit is provided in the fluid supply system to the brakes in series with the pilot's control valve. This permissive valve unit has an inlet valve resiliently held in open position to enable the pilot to control the application of the brakes and an exhaust valve which is closed when the inlet valve is open. The inlet valve is closed and the exhaust valve then opened by a hydraulic actuating mechanism, such as a piston and transmission to which pressure fluid is supplied under the control of the landing gear mechanism as it moves to retracted position. Accordingly, in the system of this co-pending application, the supply of fluid to the brakes is closed and the exhaust therefrom opened when the landing gear is retracted and the brakes are thus rendered inoperative. The valves of the permissive unit are engaged and held in this position by a release or latch which is actuated centrifugally by the rotation of the landing wheels to release them to operative position.

It is, however, desirable to have the brakes applied to the landing wheels when in the retracted position to keep them from spinnnig when in flight, to release them when the landing gear is lowered and then to hold the brakes inoperative until the landing wheels rotate on the ground after landing.

Our present invention provides a braking system, usable preferably with the systems of said Patents Nos. 2,656,017 and 2,692,100 in which brake fluid is supplied to, and maintained on, the brakes when the landing gear is retracted, is released when the landing gear is lowered, and can not be again supplied until the landing wheels rotate.

This is accomplished in our invention by connecting the exhaust valve of the permissive unit to the fluid supply of the retractive mechanism or to a relay valve in the brake fluid supply and actuated by the retractive mechanism so that, when the undercarriage is retracted, and the inlet valve of the permissive unit is closed and the exhaust valve thereof is open, fluid passes from the retractive system or through a relay controlled thereby through the exhaust valve of the permissive unit and thence to the brakes to hold them while the retractive mechanism is in retracted position. When the retractive mechanism lowers the undercarriage it opens an exhaust passage from the exhaust valve of the permissive unit and the brakes are released. Thereupon the control of the brakes is under the mechanism of Patent No. 2,692,100.

Fluid is supplied to the retractive mechanism at a much higher pressure than that of the braking system and it is therefore desirable that the fluid be supplied to the permissive unit from the brake system through a relay or sequence valve controlled by the retractive mechanism.

In this arrangement the sequence valve or relay is incorporated in a branch circuit of the brake fluid supply system and is operated either mechanically from the retractive mechanism of the undercarriage or by a fluid transmission operating a piston in the sequence valve or relay. The relay or sequence valve comprises a receiving chamber or plenum chamber into which the branch circuit delivers, a supply or distributing chamber connected to the exhaust of the permissive unit into which the receiving or plenum chamber delivers through a valve seat port, and an exhaust chamber from which fluid is exhausted. A valve normally closes the valve port from the plenum chamber to the distributing chamber and connects the distributing chamber to the exhaust chamber. Actuation of the retractive mechanism to lift the undercarriage actuates the port from the plenum chamber to the distributing chamber and to close the passage from the distributing chamber to exhaust. Fluid under pressure thereupon flows from the brake supply system through the branch circuit to the exhaust of the permissive unit and thence to the brakes. Lowering of the undercarriage causes the valve in the relay to close the port from the plenum chamber to the distributing chamber and then to open the passage to the exhaust chamber thus permitting the exhaust of fluid from the brakes through the exhaust of the permissive unit and the relay valve.

Figure 2:
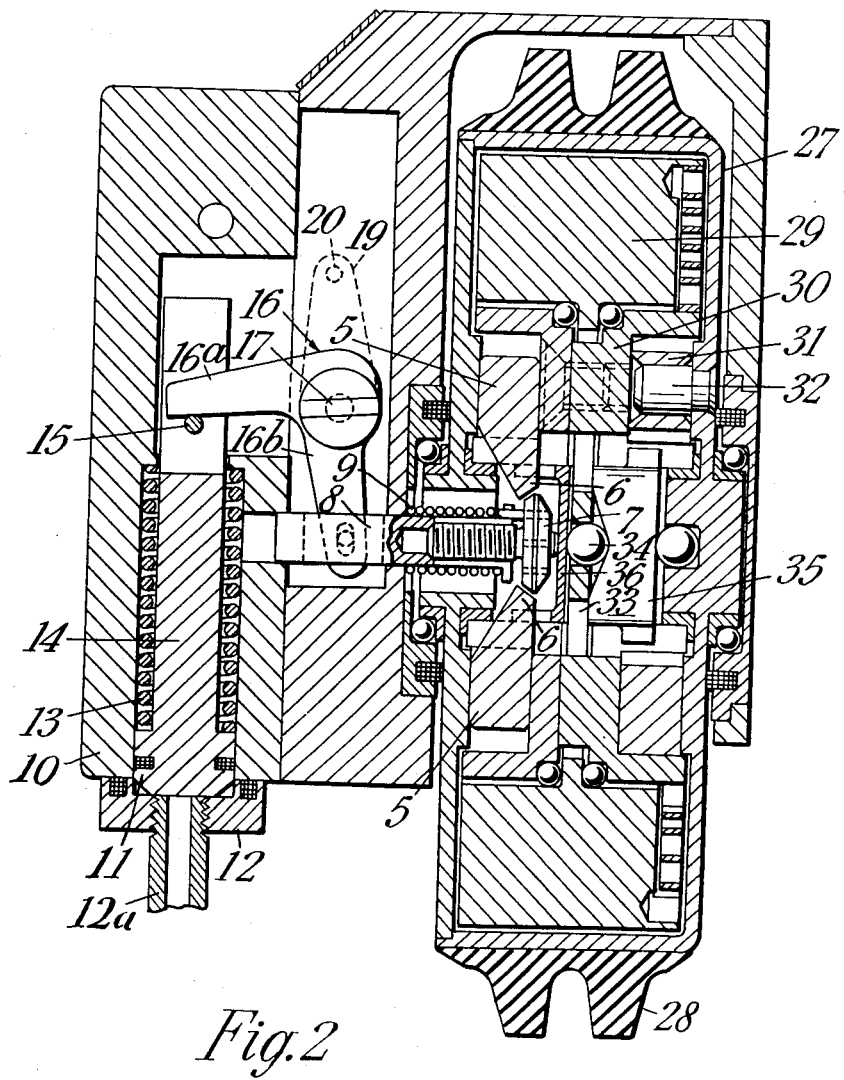
Figure 3:
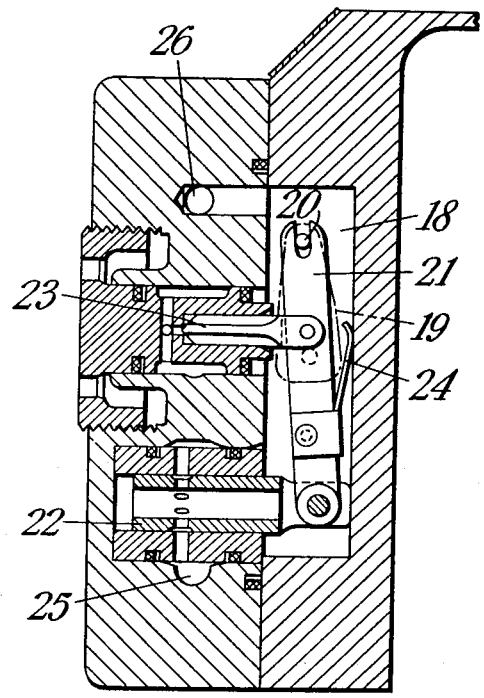
Figure 4:
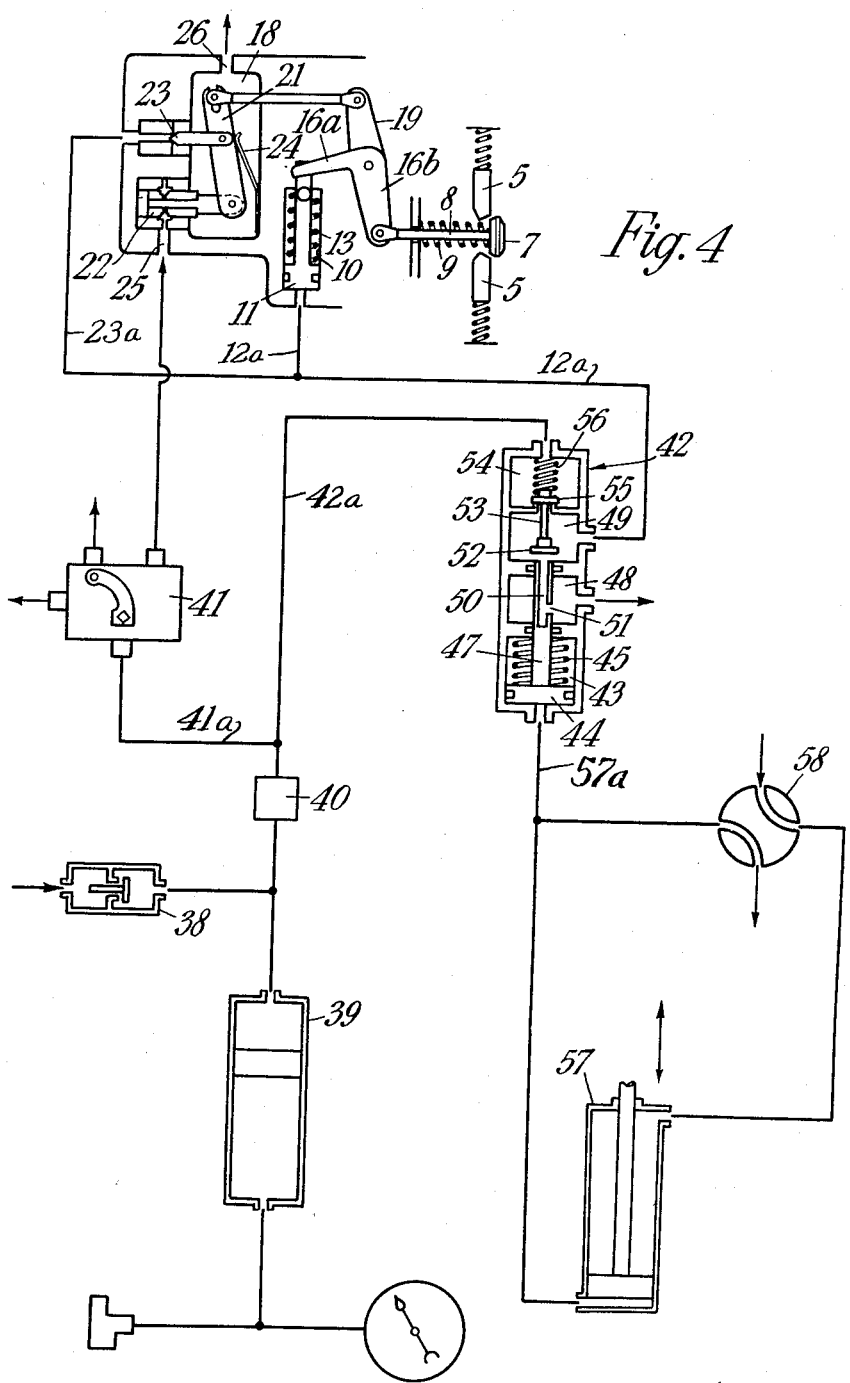
Figure 5:
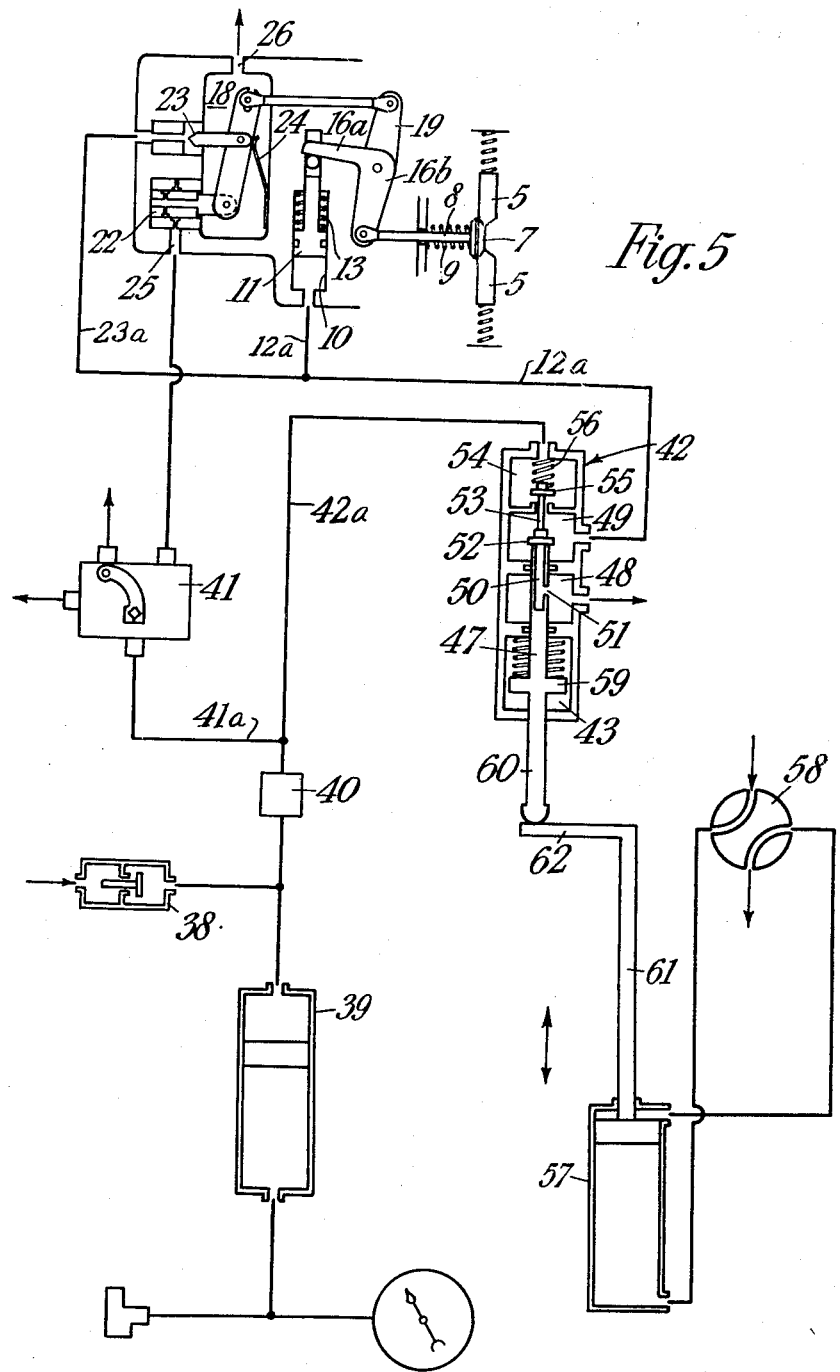
Figure 6:
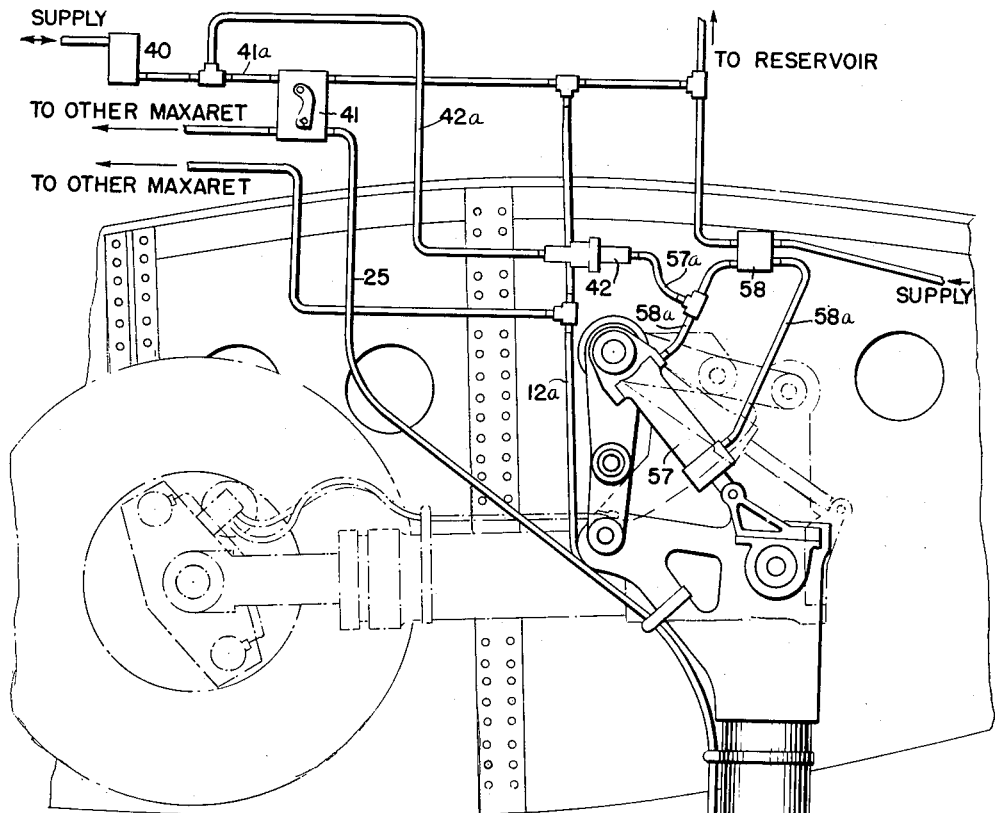

The various features of our invention are illustrated by way of example in the accompanying drawings, in which:

Fig. 1 is a sectional view of a permissive unit as disclosed in U. S. Patent No. 2,692,100 forming an element of a combination embodying a preferred form of our invention, Fig. 2 is a section of a permissive unit as disclosed in Patent No. 2,656,017, which may alternatively be used as an element of the combination in place of the unit of Fig. 1, Fig. 3 is a section through a valve mechanism forming part of the permissive unit corresponding to either Fig. 1 or Fig. 2, Fig. 4 is a diagrammatic view of a braking system constructed in accordance with our invention in which a relay or sequence valve is actuated from the retractive mechanism through a hydraulic transmission, the system being shown in "uncocked," brake applying, position, Fig. 5 is a diagrammatic sketch similar to that of Fig. 4 showing a mechanical transmission from the retracting device to the relay or sequence valve, the system being shown in the "cocked" position with brake fluid supplied through the relay or sequence valve and the exhaust valve of the permissive unit to the brakes, and Fig. 6 is a view of the apparatus of our invention showing the manner of its application to the aircraft and the piping connecting the various elements of the system.

In one embodiment of the invention a device (Figure 1) for preventing the application of braking pressure before the landing wheels rotate on landing comprises a bracket 1 non-rotatably secured adjacent one side of each landing wheel and provided with a bifurcated portion 2 in which a fly-wheel 3 rotates on bearings. The fly-wheel is provided on its outer periphery with a solid twin-contact tyre 4 adapted to engage with an annular flange carried by the rim of the wheel. The fly-wheel is thus rotatable with the wheel.

Two arcuate centrifugal releases 5 are provided in a recess in one side of said fly-wheel and said releases are spring-loaded inwardly. Each of said releases is provided at its inner periphery and substantially intermediate its ends with an inwardly-extending peg 6, said pegs being adapted to engage with an annular member 7 at the end of an operating rod 8 which is slidably fitted in a hole in the housing and which projects into the recess in the flywheel. A spring 9 is provided to urge the rod towards the flywheel.

The bracket is provided with a cylinder 10 the axis thereof being normal to the operating rod and in line therewith, and a piston 11 is slidable therein. One end of the cylinder is provided with a fluid-tight cap 12 having a connection 12a, Figs. 4, 5 and 6 to a source of pressure fluid controlled by the retractive mechanism and a spring 13 is provided between the piston and the other end of the cylinder. A piston rod 14 secured to said piston, extends through the end of the cylinder remote from the cap 12, said rod being provided at its end with a flat, and from the side of the flat a spigot 15 extends outwardly. An L-shaped lever 16 is fitted to one end of a spindle 17 rotatable in the housing, the end of one limb 16a of said lever abutting one side of the spigot 15 and the other end of the other limb 16b being secured to the end of the operating rod remote from the annular member 7. The spindle extends fluid-tightly through a partition wall into a pressure chamber 18 (Figure 3) and the end in said chamber is provided with an arm 19 diametrically opposed to the limb 16b of the L-shaped lever. The arm is provided with a peg 20 which fits into a slot in the end of a beam 21 located in said chamber. The beam is connected at one end to an inlet valve 22 of the sliding type and adjacent the other end to an exhaust valve 23. A spring 24 is provided to so bias the beam that the inlet valve opens after the exhaust valve closes and the exhaust valve closes before the inlet valve opens. A conduit 25 leads from the inlet valve and through a control mechanism under the pilot's control to a source of pressure fluid. Another conduit 26 leads from the chamber 18 to the brakes of the aircraft landing wheels.

The cylinder 10 of the piston and cylinder mechanism is operatively connected to the retraction side of the jack used for controlling the movement of the undercarriage and the exhaust valve 23 of the valve mechanism is also connected to said retraction side by a branch conduit 23a, Figs. 3 and 4.

The system operates as follows. When the aircraft takes off the inlet valve of the valve mechanism is open and the exhaust valve closed and since the pilot's control is closed no braking pressure flows through the valve mechanism. The landing wheels are thus free to rotate. When the aircraft is airborne a cock is operated by the pilot to retract the undercarriage and fluid pressure from this side of the undercarriage jack flows to the cylinder 10 of the piston and cylinder device and also to the closed exhaust valve 23 of said valve mechanism. The pressure on the piston 11 moves it against its spring, the spigot on the piston rod engaging with the limb 16a of the L-shaped lever and angularly moving said lever to withdraw the operating rod 8 against its associated spring. The annular member 7 at one end of said rod moves between the centrifugal releases, which are still held outwardly by the rotating wheel and is held on the other side of said releases.

Angular movement of the L-shaped lever rotates the spindle on which it is mounted, and rotation of this spindle angularly moves the arm in the pressure chamber which, in turn, moves the valve beam to first close the inlet valve, and then open the exhaust valve. Fluid pressure from the retraction side of the jack thus can flow through the open exhaust valve, into the pressure chamber and thence to the wheel brakes. With the wheels braked the centrifugal releases move inwardly under the action of their springs to trap the annular member in the "cocked" position, wherein the inlet valve of the valve mechanism is closed and the exhaust valve open. Thus the brakes are applied for as long as the retraction side of the jack is pressurized, which may be for the duration of the flight.

When the pilot prepares to land he operates the cock to connect the retraction side of the jack to a fluid reservoir and the lowering side to the source of fluid pressure. The pressure in the retraction side of the jack is therefore exhausted as the lowering side is increasingly pressurized, and the pressure fluid in the brake and pressure chamber thus flows to the reservoir as the undercarriage is lowered preparatory to landing, so that the landing wheels are freely rotatable once more. The piston 11 in the piston and cylinder device also moves back under the influence of its spring. The annular member at the end of the operating rod, however, is trapped by the centrifugal releases to hold the rod in such a position that the exhaust valve is kept open and the inlet valve shut. Thus, even though the pilot operates his control to allow fluid pressure to flow to the valve mechanism, said pressure will be held at the inlet valve.

As the aircraft lands the wheels spin and the centrifugal releases are thrown outwardly by the centrifugal force, thus releasing the annular member. The operating rod moves back under the action of its spring, in turn moving the valve beam to first close the exhaust valve and then open the inlet valve. Braking pressure can thus flow from the pilot's control through the pressure chamber to the brakes in the normal manner.

In another and preferred embodiment of the invention, illustrated in Figure 2, the device for preventing the application of braking pressure before the landing wheels rotate is associated with an automatic braking apparatus of the type described in Patent No. 2,656,017.

In this embodiment of the invention a hollow annular housing 27 is rotatable in bearings between the bifurcations of the bracket and is provided at its periphery with a solid rubber tyre 28 adapted to contact a portion of the wheel whereby the housing is rotatable by the wheel. An annular fly-wheel 29 located within the housing is rotatable on bearings carried on the outer periphery of an annular drum-member 30 which is in turn rotatable on bearings carried by the housing adjacent the centre of rotation thereof. An annular recess is provided at one side of the drum-member and a slipping clutch mechanism 31 is located therein, said mechanism being driven by a peg 32 extending inwardly from the side of the housing. A beam 33 extends diametrically across the fly-wheel, through slots in the drum-member, being provided at each side of the centre thereof with a small hole each to accommodate a ball 34. A cam member 35 is rotatable within the inner periphery of the annular drum-member and is axially slidable relative thereto and is provided on the face adjacent the beam with a shallow slot of V-section in which the balls 34 are normally seated. On the side of the beam remote from the cam member a disc 36 is slidably located, said disc abutting the annular member 7, hereinabove described, located at the end of operating rod 8. The inwardly spring-loaded centrifugal releases 5 are in this embodiment of the invention associated with the drum-member 30 on the side remote from the clutch mechanism. This apparatus, and the method of operation thereof are fully described in Patent 2,656,017.

As the aircraft fitted with the device and apparatus described above lands, the wheels rotate, and the device is "uncocked" and braking pressure, at a value determined automatically by the braking apparatus, flows into the brakes to decelerate the aircraft. The operation of the device for preventing braking pressure from flowing into the brakes before landing and for permitting the flow of pressure fluid after landing is precisely the same as hereinabove described.

It frequently happens that the pressure required to raise or lower the aircraft undercarriage is in excess of that required for normal braking, and far in excess of that required merely to prevent the wheels spinning. When the retraction side of the jack is directly connected to the brakes when the device is cocked, therefore, a considerably strengthened brake mechanism is required. This difficulty is overcome in the preferred system by employing a sequence valve and pressure reducing valve in the system, whereby retraction of the jack operates the sequence valve to allow pressure from the output side of the reducing valve to flow through the exhaust valve of the device and thence to the wheel brakes.

The preferred system is illustrated diagrammatically in Figures 4 and 5. In Figure 4 the device is shown in the "uncocked" position, i. e. during or after landing, and in Figure 5 the device is shown in the "cocked" position, i. e. preparatory to landing. In the preferred system the pressure fluid, which is preferably a hydraulic liquid, is passed from the pump through a non-return valve 38 to a T-junction, one branch of which leads to a hydraulic accumulator 39 and the other branch leads to a reducing valve 40. From the reducing valve one pressure line 41a leads to the differential brake control mechanism 41 under the control of the pilot of the aircraft, and thence is connected to the conduit 25 associated with the inlet valve. The other pressure line 42a leads to one end of a sequence valve 42.

This valve comprises four co-axial chambers located adjacent one another in a single housing. In the first or plenum chamber 43 at one end of the valve is a piston 44 (Figure 4) liquid-tightly slidable against spring means 45, said piston being provided on one side with a stem 47 which extends axially and liquid-tightly through the adjacent chamber 48 and into the third chamber 49. A hole 50 is drilled centrally and co-axially through said stem from the end thereof, and said end is formed as a valve seat. A hole 51 drilled diametrically through the stem connects said hole 50 to the second chamber 48. The chamber 48 is connected to a liquid reservoir.

An exhaust valve 52 is adapted to seat on said valve seat and a stem 53 extends therefrom through a passage between the chamber 49 and the fourth chamber 54. An inlet valve 55 is secured to the other end of the valve stem. The end of the passage between the chambers 49 and 54 is formed as a valve seat in chamber 54 to co-operate with the inlet valve 55, and spring means 56 normally keep the inlet valve seated on said valve seat.

The chamber 54 is connected to the pressure line 42a, hereinabove referred to, leading from the pressure reducing valve 40. The chamber 49 is operatively connected by conduits 12a and 23a to the exhaust valve 23 and to the cylinder 10 of the device for preventing application of braking pressure before the landing wheels rotate on touching down.

A double-acting jack 57 of conventional type is provided to raise or lower the undercarriage. The two ends of the jack are connected to a source of hydraulic liquid, e. g. a pump, through a conduit 58a and a four-way cock 58 under the control of the pilot of the aircraft, whereby when the retraction side of the jack is pressurized the lowering side is connected to the liquid reservoir, and vice versa. The retraction side of the jack is operatively connected by a conduit 57a to the chamber 43 of the sequence valve, hereinabove described.

Figure 4 shows the system with the device "uncocked," i. e. after the landing wheels have rotated on touching down, and before the undercarriage has been retracted on taking off again. The retraction side of the jack is connected to the liquid reservoir, chamber 43 of the sequence valve is consequently unpressurized, exhaust valve 52 is open and inlet valve 55 closed. The exhaust valve 23 of the device is closed and inlet valve 22, which is operatively connected to the brake control mechanism 41, is open. A selected braking pressure may thus be applied by the pilot through said mechanism 41 which passes through the inlet valve and into the pressure chamber 18 and thence to the wheel brakes. The brakes may be released by the pilot operating the mechanism 41 to allow the braking pressure to flow back through said mechanism to the liquid reservoir.

When the aircraft has taken off again, the pilot operates the four-way cock to connect the retraction side of the jack to the source of hydraulic pressure and the lowering side to the reservoir. Pressurizing the retraction side of the jack also pressurizes the chamber 43 of the sequence valve and as the undercarriage rises the piston 44 moves against its spring. The stem moves with the piston to first close the exhaust valve 52 and then open the inlet valve 55. Pressure from the reducing valve 40, reduced to a suitable value, thus passes into the chamber 54, through the chamber 49 and thence to the cylinder 10 of the device for preventing application of the brakes before the wheels rotate on landing. Increase in pressure in said cylinder forces the piston 11 slidable therein against its associated spring to cock the device and simultaneously open the exhaust valve 23 and close the inlet valve 22 in the manner hereinabove described. Hydraulic pressure from the output side of the reducing valve thus flows into the brakes to prevent the wheels spinning. This pressure is held in the brakes all the time that the retraction side of the jack is pressurized, which is usually for the duration of flight.

In Figure 5 is shown the system with the device in the "cocked" position. A modification is introduced in this diagram whereby the sequence valve is operated mechanically on retraction of the undercarriage. The piston in chamber 43 is replaced by a plunger 59 having a portion 60 slidably and axially extending through the end wall of the sequence valve. The piston rod 61 of the double-acting jack 57 is provided with an abutment 62 which is adapted to contact the end of said portion 60 near the end of the retraction stroke of the jack and thereby to operate the sequence valve in the manner hereinabove described.

Our invention as illustrated by way of example in the drawings and specification, by supplying brake fluid through the exhaust valve of the permissive unit when the retractive apparatus is in retractive position automatically applies the brakes when the aircraft is in flight and keeps them from spinning. When the retractive apparatus is lowered preparatory to landing, this exhaust line is opened so that the permissive device may close the supply of fluid to the brakes and prevent their operation until after the aircraft has touched ground and the wheels rotate. It will be understood that other, equivalent, constructions of a permissive device may be used in place of that specifically illustrated herein.

Having described our invention, what we claim is:

1. Apparatus for controlling the application of the brakes of aircraft having a retractable under carriage which comprises a permissive unit having an inlet valve to admit brake fluid to air craft brakes, an exhaust valve to exhaust brake fluid from said aircraft brakes, valve actuating means resiliently holding said inlet valve open and said exhaust valve closed and a centrifugally releasable means to hold said inlet valve in closed position and said exhaust valve in open position, a fluid actuated means to move said inlet valve to closed position and said exhaust valve to open position, a fluid supply line to said fluid actuated means and to said exhaust valve to supply fluid through said exhaust valve to said brakes and a valve mechanism comprising a supply inlet, a supply outlet to said fluid supply line, an exhaust outlet and a valve operable with the undercarriage retraction of said aircraft to connect said supply inlet to said supply outlet and to said fluid supply line when said undercarriage is in retracted position and to connect said supply outlet and said fluid supply line to said exhaust outlet when said under carriage is in lowered position.

2. The apparatus of claim 1 in which said valve operable with the undercarriage retraction comprises an inlet chamber, a distributing chamber connected to said line, an exhaust chamber, an inlet valve in said inlet chamber to control passage of fluid from said inlet chamber to said distributing chamber, an exhaust valve in said distributing chamber operatively connected to move with said inlet valve to open and close said distributing chamber to said exhaust chamber and an actuating member movable by the undercarriage mechanism to move said valves to open and closed positions, respectively.

3. The apparatus of claim 1 in which said fluid actuated means comprises a cylinder and piston and in which said apparatus comprises a fluid control relay comprising an inlet chamber, an operating chamber having an inlet port from said inlet chamber and delivering to said cylinder and piston and to the exhaust valve of said permissive unit, an exhaust chamber, a slidable stem extending fluid-tightly through said exhaust chamber and into said operating chamber, said stem having a passage connecting the two chambers, an exhaust valve to seat on the end of the stem, an inlet valve in the inlet chamber connected to said exhaust valve and spring-urged to seat on said inlet port, and means operable from the retractable under carriage on retraction to first close the relay exhaust valve and then open the relay inlet valve and on lowering of the under carriage moves said valves in the reverse directions.

4. The apparatus of claim 3 in which the means to move the stem comprises a piston secured to said stem, a cylinder enclosing said piston, a spring resiliently pressing said stem away from the relay exhaust valve, and a fluid line controlled by the undercarriage to supply fluid to said cylinder to move said stem against the action of said spring.

5. The apparatus of claim 1 in which said permissive unit comprises a freely rotatable fly wheel, a driving element to be rotated by a wheel of said air craft to drive said fly wheel forwardly, and a transmission actuated by relative movement of said driving element and said fly wheel to close the inlet valve and open the exhaust valve of said unit.

6. The apparatus of claim 5 in which said transmission comprises a cam.

7. A braking system for aircraft having hydraulically operated undercarriage mechanism which comprises a permissive unit for controlling the supply of brake fluid, said permissive unit having an inlet valve, an exhaust valve, a lever mechanism operatively connected to said valves, an operating rod connected to said lever mechanism and spring-urged to close the exhaust valve and open the inlet valve, and a pair of rotatable latches spring loaded to engage and prevent movement of said rod and centrifugally operated on rotation to release said rod, a cylinder, a spring-loaded piston in said cylinder connected to said lever mechanism, a pressure reducing valve, and a sequence valve connected to receive fluid from said pressure reducing valve and operable from the undercarriage mechanism to supply said fluid to said cylinder and to the exhaust valve of said permissive unit, and to receive and exhaust fluid from said exhaust valve.

8. The braking system of claim 7 in which the sequence valve comprises an inlet chamber connected to the reducing valve, an operating chamber connected to said cylinder and to the exhaust valve of said permissive unit and having a connecting port from said inlet chamber, an exhaust chamber, a slidable stem extending fluid-tightly through said exhaust chamber and into said operating chamber, said stem having a passage to connect said chambers, an exhaust valve to seat on the end of the stem and close said passage, an inlet valve in the inlet chamber connected to said exhaust valve and spring urged to seat on said connecting port, and means to move the stem responsive to the movement of the undercarriage, whereby movement of said undercarriage to retracted position moves the stem to first close the exhaust valve of the sequence valve and then to open the inlet valve thereof.

9. The braking system of claim 8 in which said means to move the stem of the sequence valve comprises a spring loaded plunger secured to said stem and having a part to contact a moving part of the undercarriage mechanism.

References Cited in the file of this patent

UNITED STATES PATENTS

| | | |
|---|---|---|
| 2,347,847 | Schnell | May 2, 1944 |
| 2,459,665 | Majneri | Jan. 18, 1949 |
| 2,692,100 | Trevaskis | Oct. 19, 1954 |